Feb. 17, 1931.  G. MONROE  1,793,116
SPRING NUT LOCK
Filed May 25, 1928
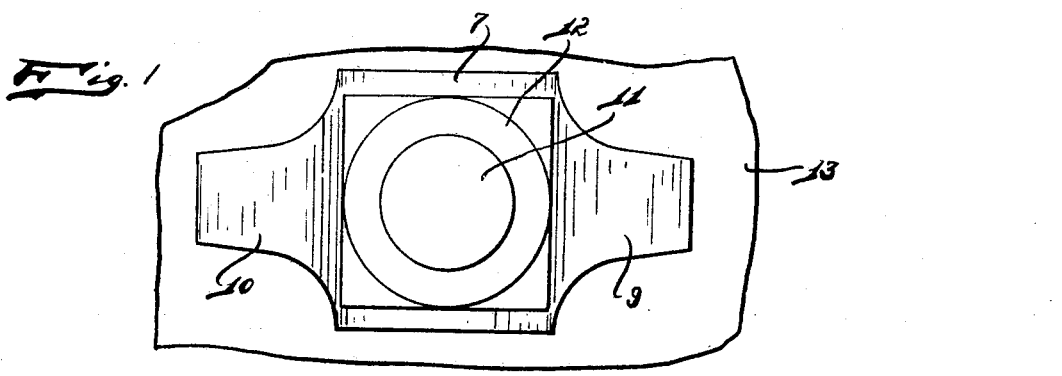
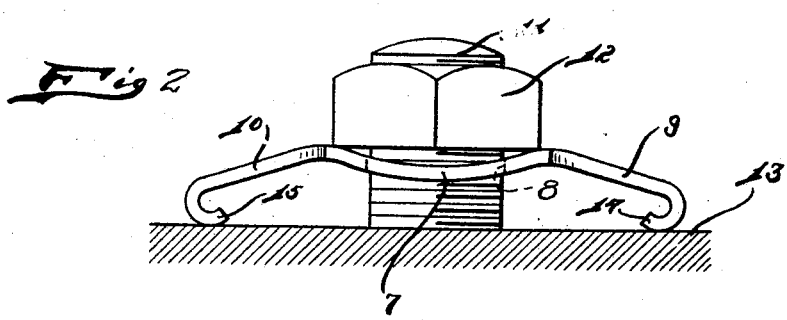
INVENTOR.
George Monroe.
BY
ATTORNEY.

Patented Feb. 17, 1931

1,793,116

UNITED STATES PATENT OFFICE

GEORGE MONROE, OF DETROIT, MICHIGAN

SPRING NUT LOCK

Application filed May 25, 1928. Serial No. 280,409.

My invention relates to a new and useful improvement in a spring nut lock and has for its object the provision of a resilient member mountable on a bolt between the workpiece and the nut, so arranged and constructed as, to when the nut is threaded tightly on to the bolt, prevent the undue unthreading of the nut therefrom.

It is another object of the invention to provide a resilient nut lock of this class in which a yieldability of the nut lock at various parts may cooperate to resist the threading of the nut thereon and bear against the nut for preventing its unthreading from the bolt.

It is another object of the invention to provide a resilient nut lock of this class having a central body normally curved and adapted, upon the threading of the nut on the bolt, to transmit sufficient strain thereto to gradually assume a straightened form and approach the inner face of the nut.

It is another object of the invention to provide a resilient nut lock having outwardly projecting legs provided with resiliency and adapted to engage the workpiece.

Other objects will appear hereinafter.

The invention consists in the combination and arrangement of parts hereinafter described and claimed.

The invention will be best understood by a reference to the accompanying drawings which form a part of this specification and in which, Fig. 1 is a top plan view of the invention showing it applied to a bolt.

Fig. 2 is a side elevational view of the invention showing it applied to a bolt.

The invention comprises a metallic plate 7 made from suitable resilient material and provided with an opening 8 formed therein. The main body 7 is curved. Projecting outwardly from opposite sides of the main body 7 are the legs 9 and 10.

In Fig. 2 I have shown the device mounted in position on a bolt 11 which extends through a workpiece 13 and upon which is adapted for threading a nut 12. As the nut 12 is threaded on to the bolt 11 and the plate 7 placed under pressure, the legs 9 and 10 which are also resilient, engaging against the workpiece 13, will be placed under a strain and have a tendency to move outwardly from each other at their ends. At the same time as this strain is increased by increased threading of the nut 12 on to the bolt 11, the arcuate or curved main body of the plate 7 will have a tendency to straighten so as to move into approach to the inner face of the nut 12, and for this purpose the opening 8 is made sufficiently large to permit this movement.

The device is adapted for locking a nut against unthreading movement, and particularly adaptable for use in connection with a fish plate.

A nut lock formed in this maner has proven most efficient in preventing undue unthreading of the nut from the bolt, the legs 9 and 10 through their resiliency and their contacting with the workpiece 13, cooperating with the resiliency in the curved plate 7 so that a maximum resistance is transmitted to the nut 12 to securely lock the same on the bolt 11.

The legs 9 and 10 are curled at their ends to provide open knuckles 14 and 15, respectively, so that with a nut lock constructed in this manner there is provided, in addition to the resiliency already referred to, additional resiliency resulting from the presence of the open knuckles 14 and 15.

It is believed evident from the simplicity of the device that an economical manufacture of the same may be carried out, while the durability of the device resides primarily in the distribution of the strains which will prevent distortion of the device after repeated use.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

A spring nut lock of the class described, comprising: a curved main body having an enlarged opening formed therein for the reception of a bolt with which used, the nut threaded on said bolt engaging the crests of said curved body, said crests being at opposite sides of said opening with a vally portion of said curved body between said crests; legs projecting outwardly from opposite sides of said main body and inclined thereto in the direction of the curve; and a curled portion on the ends of each of said legs providing an open knuckle for engaging the workpiece with which used.

In testimony whereof I have signed the foregoing specification.

GEORGE MONROE.